Sept. 13, 1938. C. T. ASHBY 2,129,982
REFRIGERATION
Filed Dec. 8, 1936
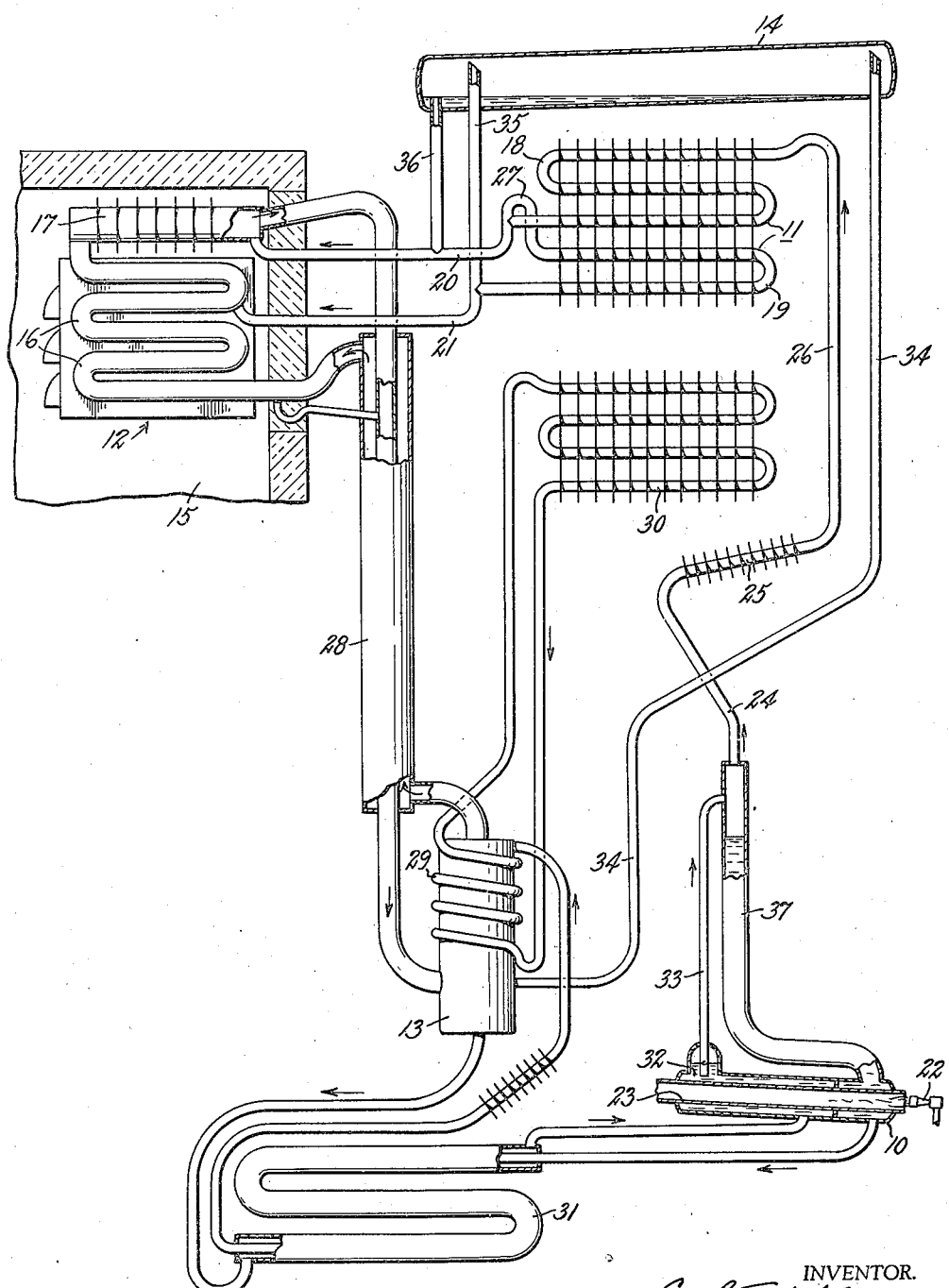
INVENTOR.
Carl T. Ashby
BY
ATTORNEY.

Patented Sept. 13, 1938

2,129,982

UNITED STATES PATENT OFFICE 2,129,982

REFRIGERATION

Carl T. Ashby, Evansville, Ind., assignor to Servel, Inc., New York, N. Y., a corporation of Delaware Application December 8, 1936, Serial No. 114,731

2 Claims. (Cl. 62—119.5)

My invention relates to absorption type refrigeration systems making use of evaporation of refrigerant fluid in the presence of inert gas and it is an object of the invention to provide a refrigeration system of this type having an improved arrangement for storage of reserve gas in the system as will appear from the following description and accompanying drawing in which the single figure illustrates a refrigeration system embodying the invention.

The system shown is generally like that described in U. S. Patent 1,609,334 to von Platen and Munters and is made up of a number of steel vessels and pipes welded together to form an hermetically sealed system. All the spaces of the system are in open and unrestricted communication so that all parts are at the same total pressure. The system contains hydrogen and a water solution of ammonia. Other suitable fluids may be used.

The parts of the system include a generator 10, a condenser 11, an evaporator 12, an absorber 13, and a hydrogen reserve vessel 14, usually referred to as a pressure vessel. The evaporator 12 is located in an insulated refrigerator storage compartment 15 and comprises a pipe coil having a lower portion 16 embedded in an aluminum casting and an upper portion 17 provided with heat transfer fins. The aluminum casting provides a freezing compartment having shelves for ice freezing trays or the like and the lower part 16 of the evaporator may be referred to as the low temperature or freezing portion. The upper finned portion 17 of the evaporator cools air in the refrigerator compartment 15.

The condenser 11 comprises a finned pipe coil for air cooling and has an upper portion 18 and a lower portion 19. The upper portion 18 is connected by a conduit 20 to the upper section 17 of the evaporator 12, and the lower condenser portion 19 is connected by a conduit 21 to the lower evaporator section 16.

The generator 10 is heated by a gas burner 22 arranged so that the flame is projected into the generator heating flue 23. Ammonia vapor expelled from solution by heat in the generator 10 flows through a conduit 24, an air-cooled rectifier 25, and a conduit 26 to the upper condenser section 18 where the ammonia vapor is condensed to liquid. The liquid ammonia flows from the lower end of the condenser section 18 through conduit 20 into the upper end of the evaporator 12. Uncondensed vapor flows from the upper condenser section 18 to the lower condenser section 19 through conduit 27 and is condensed to liquid. The liquid ammonia flows from the lower condenser 19 through conduit 21 to the low temperature evaporator section 16.

Hydrogen circulates through and between the evaporator 12 and the absorber 13 by way of a gas heat exchanger 28. In the evaporator, the liquid ammonia evaporates and diffuses into the hydrogen, producing a refrigeration effect. In the absorber 13, ammonia vapor is absorbed out of the rich gas by weakened absorption solution. The absorber is cooled by a vaporization-condensation circuit containing a suitable volatile fluid such as methyl chloride and comprising a cooling coil 29 in heat exchange relation with the absorber and connected to an air-cooled condenser 30. The gas circulation between the evaporator 12 and the absorber 13 occurs as a result of the difference in weights of the columns of the rich and weak gas, the column of gas flowing from the evaporator to the absorber and containing the greater amount of the heavier ammonia vapor being heavier than the column of weak gas flowing from the absorber to the evaporator. The described members forming the gas circuit are connected in such a manner that the gas flows upwardly through the evaporator 12 so that the partial pressure of ammonia vapor in the lower evaporator section 16 is less than the partial pressure of ammonia vapor in the high temperature section 17 which is the reason for the difference in temperatures of these evaporator sections. Liquid ammonia which enters the upper evaporator section 17 also flows into the low temperature section 16 so that this liquid is precooled in the upper evaporator section 17 before entering the low temperature section 16 from the condenser temperature to the temperature of the evaporator section 17.

The absorption solution is circulated through and between the generator 10 and the absorber 13 by way of a liquid heat exchanger 31, and circulation of the solution is caused by the lifting action of vapor formed in a chamber 32 of the generator which raises liquid through a riser 33 into the generator stand-pipe 37 where the liquid level is such that solution may overflow therefrom into the absorber.

The hydrogen reserve vessel or pressure vessel 14 comprises a horizontally elongated vessel arranged at a slight angle at a level above the condenser drain conduits 20 and 21. The high end of the pressure vessel 14 is connected by a conduit 34 to the absorber 13. The outlet end of the lower condenser section 19 is connected by a conduit 35 to the upper part of the other end of the pressure vessel 14. This conduit together with the pressure vessel 14 and conduit 34 form what is generally referred to as a vent line from the condenser to the evaporator-absorber gas circuit.

The lower end of the pressure vessel 14 is connected by a conduit 36 to the drain conduit 20. The upper end of conduit 36 extends into the pressure vessel 14 and is open a slight distance above the lower end thereof so that liquid will become accumulated in the lower end of the pressure vessel 14 before overflowing through conduit 36 and thence through conduit 20 into the upper end of the evaporator 12. During operation of the system under high room temperature conditions, the pressure vessel 14 functions as an extension of the condenser. Under these conditions, ammonia vapor enters the pressure vessel 14 from the condenser 11 and displaces reserve hydrogen from the pressure vessel through conduit 34 into the gas circuit. The ammonia vapor condenses in the pressure vessel, accumulates in the lower end thereof and overflows through conduit 36 into the evaporator 12. The quantity of liquid ammonia thus held out of circulation in the pressure vessel under these conditions causes absorption solution in the generator-absorber circuit to be at a lower average concentration. Under medium and low room temperature conditions, reserve hydrogen returns to the pressure vessel through conduit 34 as ammonia vapor is removed therefrom and the accumulated liquid ammonia evaporates and returns into circulation so that the average concentration of solution is increased. This weakening of the solution in a warm room is to obtain a desired capacity to take care of the load under these conditions. The increase in concentration of solution at medium and cool room temperatures results in greater efficiency of operation under conditions encountered during the greater part of the time of operation.

In the above arrangement I have provided a drain conduit 36 from the pressure vessel 14 to the upper part of the evaporator which is separate from the conduit 35 for vapor from the condenser to the pressure vessel. Thus, liquid ammonia from the pressure vessel 14 is delivered through conduit 36 and conduit 20 to the high temperature portion 17 of the evaporator where it is precooled before entering the freezing portion 16 of the evaporator. This improvement results in greater refrigeration at a freezing temperature in the evaporator section 16 obtained from liquid ammonia entering the evaporator from the pressure vessel.

What is claimed is:

1. Absorption refrigeration apparatus including an evaporator constructed and arranged for upward flow of gas therethrough and continuously downward flow of liquid in the presence of the gas, an absorber, members forming a circuit for gas through and between said evaporator and absorber, a generator, members connecting said generator and absorber for circulation of absorption liquid therethrough and therebetween, a condenser connected to receive vapor from said generator, a conduit for liquid from an intermediate part of said condenser to the upper part of said evaporator, a conduit for liquid from the outlet end of said condenser to an intermediate part of said evaporator, a vessel at a level above said evaporator, a conduit from the outlet end of said condenser to said vessel, a conduit from said vessel to said gas circuit, and a conduit for liquid from said vessel to the upper part of said evaporator.

2. Absorption refrigeration apparatus containing inert gas and having a circuit for the gas including an evaporator constructed and arranged for flow of gas therethrough and downward flow of liquid in the presence of the gas, a condenser, a conduit for conducting liquid formed in a first part of said condenser to the upper part of said evaporator, a conduit for conducting liquid formed in a second part of said condenser to a lower part of said evaporator, a gas storage vessel at a level above said evaporator, a conduit from the outlet end of said condenser to said vessel, a conduit from said vessel to said gas circuit, and a conduit for conducting liquid from said vessel to the upper part of said evaporator, the flow of gas in said circuit being such that the upper part of said evaporator is at a higher temperature than said lower part, whereby liquid from the first part of said condenser and liquid from said gas storage vessel is precooled at the upper part of the evaporator before entering the lower part of the evaporator.

CARL T. ASHBY.